United States Patent Office 3,519,697
Patented July 7, 1970

---

3,519,697
FLAME RETARDANT EPOXY RESINS
Kenneth R. Price and Fred J. Martin, Schenectady, N.Y., assignors to General Electric Company, a corporation of New York
No Drawing. Filed Apr. 15, 1968, Ser. No. 721,169
Int. Cl. C08g 51/62
U.S. Cl. 260—830                                          9 Claims

ABSTRACT OF THE DISCLOSURE

The flame retardancy of epoxy resins can be improved by incorporating a triaryl stibine. Such compositions are suitable for the preparation of cured resinous products which are to be used in applications requiring good electrical insulation characteristics and flame retardant properties.

---

The present invention relates to new and improved flame retardant and self-extinguishing epoxy materials. More particularly, the invention is concerned with new and improved heat-curable mixtures comprising one or more epoxy resins and, as a flame retardant agency, a minor amount of a triaryl stibine corresponding to the formula $$Sb(Ar)_3$$

where Ar is an aryl group, for example, phenyl, tolyl, xylyl, naphthyl, etc., sufficient to improve the flame retardancy of the resin. The aryl groups on the antimony atom may be the same or different.

Epoxy compositions having the grouping

are well known, commercially available materials having a variety of applications in the art. Generally, such epoxy materials comprise a polyether derivative of a polyhydric organic compound, the derivative containing 1,2-epoxy groups and the organic compound being selected from the group consisting of polyhydric alcohols and polyhydric phenols containing at least two hydroxy groups. For example, U.S. Pat. 2,324,483, issued to Castan, discloses epoxy resin compositions comprising the reaction product of phenols having at least two phenolic hydroxyl groups and an epihalohydrin, such as epichlorohydrin. The reaction product disclosed is described as having these two epoxy groups and may be cured to a thermoset infusible mass by the use of a carboxylic polybasic acid, or acid anhydride such as phthalic anhydride, or even a variety of organic "amine type" materials as is shown for instance in Castan Pat. 2,444,333.

Although cured epoxy resins are known to have good heat resistance which is usually better than the heat resistance of other polymers, such as natural synthetic rubbers, in certain applications however, particularly in coating and casting applications, it has been found that these epoxy resins at temperatures encountered in direct contact with an open flame do not have the desired flame retardancy properties which some applications may require. Because of the presence of organic groups in the epoxy resin structure, once the flame is applied to the resin, even though it may contain a large amount of inorganic filler, the epoxy resin will continue to burn unless extinguished by external means.

A number of means have been suggested for improving the flame retardancy of epoxy resins. Often these means involve the incorporation of antimony oxide and a halogenated compound. Although the flame retardancy is generally improved by such means, nevertheless the presence of the halogen compound or the resulting halogen by-products derived from the reaction of antimony oxide and halogen compounds has led to a number of problems. In the first place, the presence of antimony oxide in the polymer causes castings made from such epoxy resin mixtures to be opaque. Furthermore, the presence of the halogen added to the polymer may cause problems of corrosion and in applications where the epoxy resin will come in contact with metallic substrates such as copper in conductor applications, this could be a serious problem. Therefore, it would be desirable if it were possible to eliminate the use of antimony oxide and halogen compositions in realizing the flame retardancy of these epoxy resins.

Unexpectedly we have discovered that the incorporation of a triaryl stibine, such as triphenyl stibine, even in relatively small amounts of the order of 0.1 to 20 percent, by weight, based on the total weight of the epoxy resin and curing agent, markedly improves the flame retardancy of the epoxy resins in a manner equal to and in some respects greater than those obtainable by the use of the prior art methods for promoting flame retardancy in these polymers. It was unexpectedly discovered that this ability to impart flame retardancy is highly specific to epoxy resins. Thus, it was surprising to find that the addition, for instance, of triphenyl stibine to polyethylene in the absence of any chlorinated additive or chlorine presence, caused little improvement in the flame retardancy of the polymer. Accordingly, it was highly surprising to find that the triaryl stibine proved so effective in the epoxy resins in the absence of halogen. Moreover, we have also discovered that halogenated, for example, brominated epoxy resins, when combined with the triaryl stibine can also have the flame retardancy still further improved even when the amounts of the triaryl stibine used are quite small. Finally, the use of the triaryl stibines gave transparent cured epoxy resin products.

The epoxide polymers used in the instant invention include glycidyl polyethers of a dihydric phenol having a 1,2-epoxy equivalency greater than 1.0 and not more than 2, i.e., having 1–2

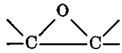

groups in the average molecule of the glycidyl ether. The glycidyl polyethers of dihydric phenols are usually mixtures of polyether polymers and as a result the measured molecular weight upon which epoxy equivalency is determined is the average molecular weight.

For example, the glycidyl compounds of this invention can be prepared by reacting 2,2-bis(4-hydroxyphenyl)propane with epichlorohydrin in alkaline solution with varying ratios of epichlorohydrin per mole of dihydric phenol. By decreasing the mole ratio of epichlorohydrin from 2 to 1, the average molecular weight is increased.

The 1,2 epoxide equivalency of these compounds is determined by heating a weighed sample of the epoxide polymer with an excess of 0.2 N pyridinium chloride chloroform solution at the boiling point under reflux for 2 hours as the pyridinium chloride hydrochlorinates the epoxy groups to chlorohydrin groups. On cooling, the excess pyridinium chloride is back-titrated with 0.1 N NaOH in methanol to the phenolphthalein end point.

Examples of dihydric phenols that can be reacted with chlorohydrin in alkaline solution to yield the glycidyl ethers are mononuclear phenols like resorcinol, catchol, hydroquinone, etc., or polynuclear phenols like 2,2-bis(4-hydroxyphenol)propane, bisphenol 4,4'dihydroxybenzophenone, 1,1-bis(4-hydroxyphenyl)ethane, 1,1-bis(4-hydroxyphenyl)isobutane, 2,2-bis(4-hydroxyphenyl)butane, 2,2-bis(4-hydroxy-2-methylphenyl)propane, 2,2-bis(4-hydroxy-2 - tertiarybutylphenyl)propane, bis(2-hydroxynaphthyl)methane, 1,5-dihydroxynaphthalene, etc.

Although the epoxide polymer is a complex mixture, it may be represented by the following formula:

(I)

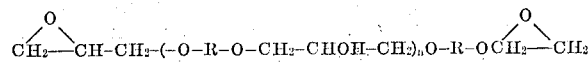

where R is a divalent hydrocarbon radical of a dihydricphenol and $n$ is a whole number from 1 to as high as 10 to 1000 or more. The value of $n$ can be varied by changing the molecular proportions of epichlorohydrin and dihydricphenol.

The preparation of these epoxy compounds is disclosed in U.S. Pats. 2,615,007 and 2,615,008 both granted to Greenlee. Further examples of the epoxy resins (which term is intended to include cycloaliphatic epoxy resins) which may be employed in the practice of the invention are found disclosed in U.S. Pat. 3,249,587, Searles, issued May 3, 1966, and assigned to the same assignee as the present invention; by reference, these patents are made part of the disclosures of the instant application.

A particular epoxy resin which has been found especially useful is one corresponding to a general formula

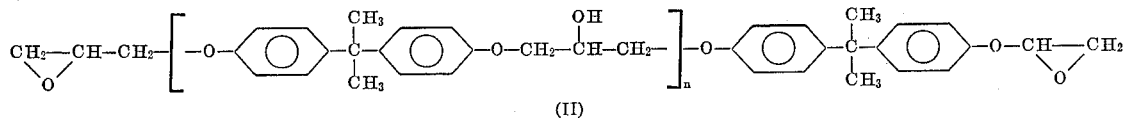

(II)

where $n$ has an average value ranging from 0 to 10 or more. Representative of the epoxy resins which can be employed in the practice of the present invention are those described below with their characteristics:

TABLE I

| Epoxy resin | Epoxide equivalent | Melting Point, °C. |
| --- | --- | --- |
| Epon 828 | 192 | 9 |
| Epon 834 | 225–290 | 20–28 |
| Epon 1001 | 450–525 | 64–75 |
| Epon 1004 | 905–985 | 97–103 |
| Epon 1007 | 1,600–1,900 | 127–133 |
| Epon 1009 | 2,400–4,000 | 145–155 |
| Epon 1062 | 140–165 | Liquid |
| Epon 1064 | 300–375 | 40–45 |
| Araldite 6010 | 192 | Liquid |
| Araldite 6020 | 200–205 | Liquid |
| Dow epoxy resin 542 (46% bromine) | 350–400 | Liquid |

The amount of triaryl stibine which may be employed in the practice of the present invention can be varied widely and is not particularly critical. Generally, even small amounts as much as 0.1 percent, by weight, of the triaryl stibine based on the total weight of the epoxy resin and curing agent begin to influence the flame retardancy. Although the amount of the triaryl stibine can vary as high as 15 to 20 percent or more, no particular advantage is derived from using amounts of the triaryl stibine in excess of 6 to 10 percent, by weight.

In practicing our invention, the presence of halogenated epoxy resins, for example, brominated epoxy resins, is not precluded. As pointed out above, still greater improvements of flame retardancy are obtainable by incooperating a triaryl stibine in halogenated epoxy resins. Such halogenated epoxy resins are readily prepared by reacting, for example, acetone with halogenated dihydric phenols with epichlorohydrin. Included among such halogenated dihydric phenols may be mentioned dibromohydroquinone, tetrabromobis(4 - hydroxyphenyl)-2,2-propane, etc.

Various catalysts or hardening agents commonly used for the purpose may be added to the epoxy resin to cure the same. Among such materials may be mentioned organic amines, for example, m-phenylenediamine, methylene dianiline, diethylenetriamine, tetraethylene diamine, aminoethylene ethanol amine, $BF_3$ complex of monoethylamine, etc. It should be recognized that a number of acids or anhydrides can also be used for curing purposes, including phthalic anhydride, hydrophthalic anhydride, tetrahydrophthalic anhydride, etc. The agent employed can be varied widely but generally is within the range of from about 0.5 to 50 percent, by weight, or more, based on the weight of the epoxy resin.

The incorporation of various fillers in the epoxy resin is not precluded. Among such fillers may be mentioned colloidal carbon, graphite, various metals such as finely divided copper, iron, etc. finely divided silica, etc. In addition other compatible polymers may be either mechanically blended or interacted with the epoxy resin prior to curing to yield still further modified flame retardant compositions.

In practicing our invention, the epoxy resin which preferably is a liquid resin, is mixed with all the solid ingredients to be employed, for example, the triaryl stibine, any fillers, etc., for a sufficient length of time to obtain a good dispersion of solid materials and liquid materials. Thereafter the catalyst is generally added last in order to avoid any premature curing of the epoxy resin. If the resinous composition is to be employed as insulation or for casting purposes, a vacuum is applied to the liquid cast material in order to remove as much of the air as is possible from the mixture of ingredients entrapped by the mixing operation. After this the liquid cast material can be used for potting purposes or can be poured into molds containing products to be encapsulated, e.g., bus bars, suitably positioned in the molds whereby satisfactory encapsulation is effected. Thereafter, the casting is permitted to remain in air for a preliminary air cure for about 30 minutes to several hours, and then baked at about 125° to 175° C. for times ranging from about 15 minutes to 3 hours or more to complete the cure. Obviously the curing cycle may be varied widely depending on such factors as the type of epoxy resin employed, the particular triaryl stibine, the particular curing agent or mixture of curing agents involved, the application involved, etc. If desired the epoxy resin containing the various additives and curing agents can be used for coating or painting applications and the treated substrates heated at elevated temperatures to complete the cure to the substantially infusible and insoluble state.

In order that those skilled in the art may understand how the present invention may be practiced, the following examples are given by way of illustration and not by way of limitation. All parts are by weight unless otherwise indicated.

In the following tests, the flame retardancy of the cured material was determined by ascertaining its oxygen index which is defined as the volume fraction of oxygen in an oxygen/nitrogen atmosphere which is required to just sustain steady candle-like burning of a stick of the material being tested. The samples used for determining the oxygen index were approximately 6 mm. x 3.2 mm. x 80 mm. in size and were cut from slabs about 20 cm. x 20 cm. x 0.32 cm. in size.

The preparation of the cast samples was as follows. The resin formulations were mixed at elevated temperatures from 60–90° C. adding the curing agent last and thereafter de-aerating with stirring under a vacuum of 25–30 mm. Hg for a minimum of 15 minutes. Any fillers that were incorporated were dried at 125° C. for 24 hours and then added to the resin formulation immediately on removal from the drying oven. Precautions were taken to insure intimate wetting of the filler with the resin mixture. The flame retardant additive was incorporated in the final stage of the de-aeration step in order to avoid any premature curing of the polymer. The completed mixture was cast into preheated molds consisting of two flat aluminum plates with a U-shaped Teflon polymer spacer and cured for the required time in an air circulating oven. On completion of the cure cycle, the casting was removed from the mold and cleaned with acetone to remove the release agent which was employed.

The actual test for determining the oxygen index was as follows. The sample was mounted vertically from the bottom end along the axis of a Pyrex glass chimney of about 3½ in. O.D. A uniform mixture of oxygen and nitrogen was allowed to pass upward through the chimney at a free-stream velocity of about 7 cm./sec. The sample was vigorously ignited at the top end with a hydrogen diffusion flame which was then withdrawn. The volume fraction of oxygen in an oxygen/nitrogen mixture which just sustained burning for the entire length of the stick was taken as the oxygen index, $$n_{O_2} = \frac{[O_2]}{[O_2]+[N_2]}$$

This oxygen index was reproducible within ±1%. Generally speaking, a material with an oxygen index ≧0.27 was considered to be self-extinguishing by Underwriters Laboratory Bulletin 94 test.

EXAMPLE 1

In this example tests were conducted in one case on an epoxy resin specifically, Epon 826, which corresponds to Formula II where $n$ has an average value equal to 0.1 and the molecular weight of the polymer is about 370. The triphenyl stibine was also tested for flame-retardant properties by incorporating it in a mixture of the aforesaid Epon 826 and a brominated epoxy resin Dow Epoxy Resin 542 (molecular weight about 750) containing about 46 percent bromine which was composed of recurring structural units of the formula

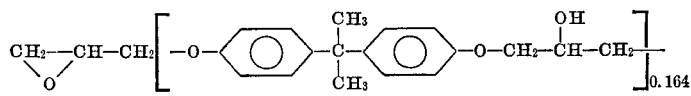

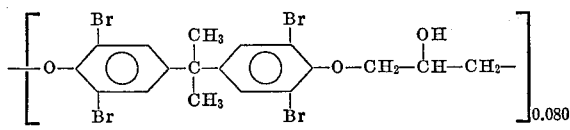 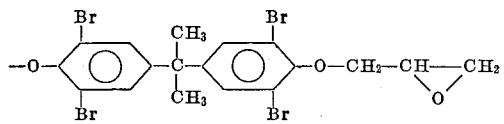

In each instance, hexahydrophthalic anhydride was added to the epoxy resin or mixture of epoxy resins both with and without the bromine. After incorporation of all the ingredients, the liquid mixture was then heated for about 24 hours at 100° C. Test samples were then cut from the cured slabs and tested in the manner described previously. The following Table II shows the epoxy resins including the brominated epoxy resins used in these tests. The designation A was composed of 100 parts of the brominated epoxy resin and 41.1 parts of a curing agent, namely, the hexahydrophthalic anhydride, while part B was composed of 100 parts of the Epon 826 and 74.5 parts of the same hardening agent. Table II also shows the weight ratios of A and B as well as the oxygen index for each of the formulations.

It will of course be apparent to those skilled in the art that in addition to triphenyl stibine employed in the foregoing example, other triaryl stibines can be employed, many examples of which have been described above, without departing from the scope of the invention. In addition a host of other epoxy resins can also be used, many of which have been provided and described above in the patents referred to earlier. A variety of curing accelerators and conditions of curing can be used as well as many fillers and other modifying agents such as dyes, pigments, etc., may be incorporated without departing from the intended invention.

The compositions herein described can be cured and are useful in a number of applications particularly for insulating purposes. One of the main uses for these highly flame retardant compositions are as insulation for copper cores, other conducting cores such as aluminum, alloys of copper, alloys of aluminum, etc. employed as bus bars in electrical equipment. In general, any application wherein these epoxy resins will come in contact with high temperatures particularly conditions where open flames may be encountered, either because of electrical conditions or for other reasons of flame presence, the compositions herein described are especially useful in producing flame retardant materials. In this connection, the composition may be employed in applications requiring resistance to extremely high temperatures such as heater ducts, protective insulation of various types of equipment such as wrap-around coated tapes for elements which may be subjected to elevated temperatures, for structural purposes in oxygen enriched atmospheres, etc. The application of the resinous composition to fibrous sheets and tapes which can then be used for protective purposes or as laminates is an obvious use where such cured composites may be employed in applications requiring resistance to extremely high temperatures where the usual polymeric compositions will ignite and continue to burn. The coating of tent material to accommodate the insertion chimneys through the top of the tent so as to present coated surfaces adjacent to the hot chimney, which will be substantially flame and fire retardant, is another use of our flame retardant compositions.

What we claim as new and desire to secure by Letters Patent of the United States is:

1. A composition of matter comprising an epoxy resin and a triaryl stibine in an amount sufficient to improve the flame retardancy of the resin.

2. A composition as in claim 1 in which the triaryl stibine is triphenyl stibine.

3. A composition as in claim 1 wherein the epoxy resin is the product of reaction of bis-(4-hydroxyphenyl)-2,2-propane and epichlorohydrin.

4. A curable composition as in claim 1 wherein a curing agent for the epoxy resin is incorporated in the mixture of ingredients.

5. The cured composition of claim 4.

6. A shaped article of a cured epoxy resin containing

TABLE II

| Test No. | Weight percent Br | Weight percent Sb | $(C_6H_5)_3Sb$ | Resin mixture A | Resin mixture B | Oxygen index |
|---|---|---|---|---|---|---|
| 1 | 0 | 0 | 0 | 0 | 200 | 0.196 |
| 2 | 0 | 0.5 | 2.9 | 0 | 197 | 0.279 |
| 3 | 0 | 2.0 | 11.6 | 0 | 188 | 0.321 |
| 4 | 0 | 4.0 | 23.2 | 0 | 177 | 0.324 |
| 5 | 0 | 6.0 | 34.8 | 0 | 165 | 0.308 |
| 6 | 13.7 | 0 | 0 | 84.3 | 115.7 | 0.236 |
| 7 | 0 | 0.5 | 2.9 | 84 | 115.2 | 0.283 |
| 8 | 0 | 1.0 | 5.8 | 84 | 110.2 | 0.301 |
| 9 | 0 | 2.0 | 11.6 | 84 | 104.4 | 0.322 |
| 10 | 0 | 3.0 | 17.4 | 84 | 101.4 | 0.340 |
| 11 | 0 | 4.0 | 23.2 | 84 | 92.8 | 0.349 |
| 12 | 0 | 6.0 | 34.8 | 84 | 81.2 | 0.326 | an effective amount of a triaryl stibine uniformly distributed therein to render said article self-extinguishing.

7. A shaped article as in claim 6 wherein the triaryl stibine is triphenyl stibine.

8. A composition of matter comprising (1) a mixture of epoxy resins composed of a non-brominated epoxy resin and a brominated epoxy resin, and (2) a triaryl stibine in an amount sufficient to improve the flame retardancy of the epoxy resin mixture.

9. The composition as in claim 8 wherein the triaryl stibine is triphenyl stibine.

References Cited
UNITED STATES PATENTS 3,198,756   8/1965   Richter _____ 260—2.5
3,240,751   3/1966   Cannon _____ 260—45.75

DONALD E. CZAJA, Primary Examiner

V. P. HOKE, Assistant Examiner

U.S. Cl. X.R.

260—2.5, 45.75; 117—137, 232